United States Patent
Soldati et al.

(10) Patent No.: US 10,440,635 B2
(45) Date of Patent: Oct. 8, 2019

(54) NETWORK DEVICE AND USER DEVICE AND METHODS THEREOF

(71) Applicant: Huawei Technologies Co., Ltd., Shenzhen, Guangdong (CN)

(72) Inventors: Pablo Soldati, Kista (SE); George Koudouridis, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/402,939

(22) Filed: Jan. 10, 2017

(65) Prior Publication Data
US 2017/0118697 A1    Apr. 27, 2017

Related U.S. Application Data

(63) Continuation of application No. PCT/EP2014/064902, filed on Jul. 11, 2014.

(51) Int. Cl.
*H04W 48/10*    (2009.01)
*H04W 16/14*    (2009.01)
(Continued)

(52) U.S. Cl.
CPC .......... *H04W 48/10* (2013.01); *H04W 16/14* (2013.01); *H04W 48/14* (2013.01);
(Continued)

(58) Field of Classification Search
CPC .. H04W 48/10; H04W 16/14; H04W 72/0453
See application file for complete search history.

(56) References Cited

U.S. PATENT DOCUMENTS 8,385,932 B2    2/2013    Callaway, Jr. et al.
2004/0063430 A1    4/2004    Cave et al.
(Continued)

FOREIGN PATENT DOCUMENTS

CN    102957474 A    3/2013
CN    103168491 A    6/2013
(Continued)

OTHER PUBLICATIONS

Koudouridis, Georgios P., "On the Capacity and Energy Efficiency of Network Scheduling in Future Ultra-Dense Networks," 2014 IEEE Symposium on Computers and Communications (ISCC), IEEE, vol. Workshops, Jun. 23, 2014, pp. 1-6, XP032649798.

*Primary Examiner* — Rhonda L Murphy
(74) *Attorney, Agent, or Firm* — Leydig, Voit & Mayer, Ltd.

(57) ABSTRACT

The present disclosure relates to a user device and a network node. The user device comprises a transceiver configured to broadcast an access signal $S_A$ when not being connected to any radio communication networks, receive an access response signal $S_R$ in response to broadcasting the access signal $S_A$, communicate with at least one network node of the radio communication network. The network node comprises a transceiver and a processor; wherein the transceiver is configured to receive a broadcasted access signal $S_A$, wherein the broadcasted access signal $S_A$ comprises identity information of the user device; wherein the processor is configured to assign at least one frequency spectrum segment for communication for the user device; and wherein the transceiver is further configured to transmit an access response signal $S_R$ to the user device.

14 Claims, 8 Drawing Sheets

110 — Broadcasting an access signal $S_A$ when not being connected to any radio communication networks, wherein the access signal $S_A$ comprises identity information of the user device 120 — Receiving an access response signal $S_R$ from a radio communication network in response to broadcasting the access signal $S_A$, wherein the access response signal $S_R$ comprises an indication of at least one assigned frequency spectrum segment 130 — Communicating with at least one network node of the radio communication network using the at least one assigned frequency spectrum segment

(51) Int. Cl.
*H04W 48/14* (2009.01)
*H04W 72/04* (2009.01)

(52) U.S. Cl.
CPC ......... *H04W 72/0453* (2013.01); *Y02D 70/00* (2018.01); *Y02D 70/1262* (2018.01); *Y02D 70/1264* (2018.01)

(56) References Cited

U.S. PATENT DOCUMENTS

| | | | |
|---|---|---|---|
| 2010/0280890 A1* | 11/2010 | Park | G06Q 30/0241 705/14.4 |
| 2011/0306350 A1 | 12/2011 | Barbieri et al. | |
| 2012/0320874 A1 | 12/2012 | Li et al. | |
| 2013/0064116 A1 | 3/2013 | Speight et al. | |
| 2013/0155991 A1 | 6/2013 | Kazmi et al. | |
| 2014/0307611 A1* | 10/2014 | Tesanovic | H04W 76/14 370/312 |

FOREIGN PATENT DOCUMENTS

| | | |
|---|---|---|
| EA | 010982 B1 | 12/2008 |
| EP | 2182754 B1 | 1/2014 |
| WO | 2006103276 A1 | 10/2006 |
| WO | 2013037842 A1 | 3/2013 |
| WO | 2013131006 A1 | 9/2013 |

\* cited by examiner

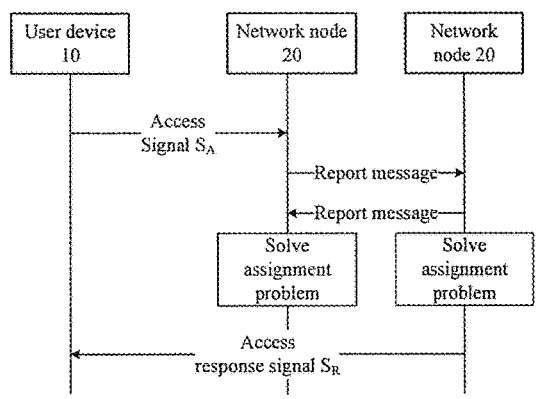
Fig. 7(a) Absence of a network control node
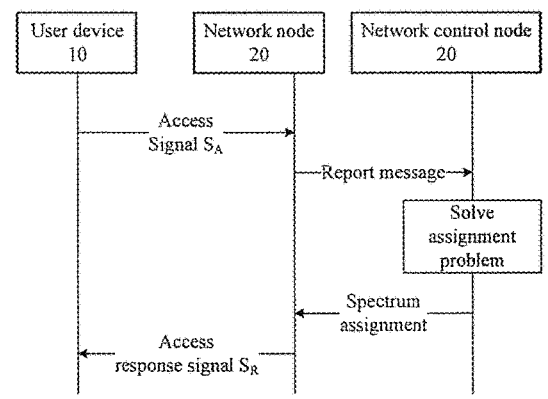
Fig. 7(b) Presence of a network control node

NETWORK DEVICE AND USER DEVICE AND METHODS THEREOF

CROSS-REFERENCE TO RELATED APPLICATIONS

This application is a continuation of International Application No. PCT/EP2014/064902, filed on Jul. 11, 2014, the disclosure of which is hereby incorporated by reference in its entirety.

TECHNICAL FIELD

The present invention relates to a network node and a user device for wireless communication systems. Furthermore, the present invention also relates to corresponding methods, a computer program, and a computer program product.

BACKGROUND

To meet the surge in traffic demand and connectivity, radio technology for communication systems is gradually shifting towards a more flexible utilization of the available frequency spectrum at the network nodes forming the radio access network infrastructure, as well as toward denser deployments of low-powered network nodes with smaller coverage area.

In this context, the quality of experience of a user (e.g., in terms of average data rate) can be improved through more flexible and dynamic connections established with the network nodes having the potential and the resources to provide the desired service. Thus, user devices should be connected to network nodes that not necessarily provide the best signal strength but rather have more resources available or, equivalently, less traffic load per frequency resource.

To that end, we consider a system where network nodes are enabled to operate in or activate only portions of an available frequency band, hereafter referred to as frequency spectrum segments. In other words, a frequency band available at a network node is partitioned into a number of frequency spectrum segments. For instance, a frequency spectrum segment may be a portion or an entire component carrier of the 3GPP Long Term Evolution, LTE, system. In another example, a frequency spectrum segment may be a portion or the entire frequency band associated with a radio access technology (RAT) available at a network node. The frequency spectrum segments available at a network node may not necessarily be contiguous in the frequency domain nor have equal size (i.e., bandwidth). Further, the size of frequency spectrum segments at a network node can be static or dynamically configurable over time to adapt to e.g., load, traffic, demand or other network parameters related to frequency spectrum segments. The term available indicates that a frequency spectrum segment is a resource of a network node. Thus, a network node may autonomously determine, or may be configured to use/activate one or more frequency spectrum segments by which it can operate.

In this context, the utilization of frequency bands and RATS available at a network node can be adapted depending on the traffic/service demand, the type of traffic, the interference pattern, as well as the energy cost of operating with a larger portion of frequency spectrum or multiple RATs. In turn, the problem of controlling and making the utilization of spectrum flexible at the network side becomes a problem of associating/connecting user devices to frequency spectrum segment(s), and hence to the corresponding network node(s), that can provide the service desired by the user device, rather than assuring a connection to the network node that offers the best signal strength.

Thus, resource allocation methods for flexible spectrum utilization at the network nodes shall comprise more advanced cell-association and inter-frequency load balancing schemes that adapt the utilization of frequency spectrum at the network nodes so as to comply with users' traffic/service demands and network's energy costs.

In traditional cellular radio systems, user devices access the network by first searching synchronization signals transmitted by network nodes and measuring the strength of the associated reference signals, and then by transmitting an access request to the network node that provides the strongest received signal.

To this end, the user device receives as part of the broadcast channel a set of preamble sequences allowed to be used for initiating a random access with a network node. Thus, the random access (RACH) signal carries information specific to the network node that is intended to receive it. In response to this, the network node provides a temporary network identity to the user device, a time advance for uplink synchronization, and a set of time-frequency resources to be used to establish a radio bearer in the subsequent steps of the access procedure. Ultimately, a radio bearer is established and data can be exchanged.

Thus, conventional solutions require a user device to first detect the presence of a network by listening, decoding, and measuring the strength of downlink reference signals transmitted by network nodes. Then a user device attempts accessing the network at the network node that provides the best signal strength. This, however, does not guarantee the best usage of the network resources nor assures the best service to the users.

For instance, assuming a network node n applies an equal share of the available time-frequency radio resources to the served user devices, the theoretically achievable average user data rate can be modelled through the Shannon bound as $$r_{m,n} = \frac{W_n}{L_n} \log_2(1 + SINR_{m,n}),$$

where $W_n$ and $L_n$ are the frequency bandwidth and the traffic load (e.g., expressed as the average number of active users served) of access node n, while $SINR_{m,n}$ is the signal to noise plus interference ratio experienced by user m from access node n.

It is clear from this equation that a network node n' with lower traffic load $L_{n'} < L_n$ can provide a higher average data throughput despite a worst signal strength (i.e., when $SINR_{m,n'} < SINR_{m,n}$).

While existing conventional solutions, such as the 3GPP Long Term Evolution Advanced (LTE-A) system, has addressed this issue for user devices already connected to the system, e.g., through mechanisms for balancing/shifting the traffic load among network nodes, there is currently no solution applicable to user devices not having a prior connection to the system.

In the mentioned conventional solutions, a user device assists the network in cell-association, handover and load balancing procedures by providing feedback related to the received signal strength from multiple network nodes. This, however, is insufficient to assure that the user device is connected or handed over to a network node with the potential to offer the required service.

A drawback of the related art is that upon detecting synchronization signals and measuring reference signals associated to one or multiple network node, a user device attempts to access the network at the network node offering the best signal strength, but not necessarily the best service. Related art systems, such as the 3GPP LTE, provide additional procedures to redirect or offload a user device to a better network node once a connection is established.

However, this requires additional system resources after the initial random access, and the overall procedure can require several hundreds of milliseconds before the user device is finally connected to the network node capable to provide the best service.

A second drawback of the related art is that it requires a user device to first search and detect the presence of the network, and not vice versa. Thus, a user device can select an access point for connecting to the network based on information related solely to the signal strength of a downlink reference signal. On the contrary, if the system had to make the decision by detecting the presence of a user device, and not vice versa, it would need more information to associate the user device to the best network node and frequency band.

Finally, the related art procedures to access a radio communication system do not scale well in the frequency domain, e.g., when access nodes can be configured to operate in multiple (eventually non-contiguous) frequency bands and with multiple radio access technologies.

SUMMARY

An objective of embodiments of the present invention is to provide a solution which mitigates or solves the drawbacks and problems of conventional solutions.

Another objective of embodiments of the present invention is to provide a solution by which a user device can access the radio communication network through one or multiple frequency spectrum segments and/or radio access technologies without prior knowledge of the overlay radio communication systems.

Yet another objective of embodiments of the present invention is to provide resource allocation solutions in the radio network for flexible/adaptive spectrum utilization at the network nodes in a radio communication system.

The above objectives are solved by the subject matter of the independent claims. Further advantageous implementations can be found in the dependent claims.

According to a first aspect of the invention, the above mentioned and other objectives are achieved with a user device for a wireless communication system, the user device comprising a transceiver configured to broadcast an access signal $S_A$ when not being connected to any radio communication network, wherein the access signal $S_A$ comprises identity information of the user device, receive an access response signal $S_R$ from a radio communication network in response to broadcasting the access signal $S_A$, wherein the access response signal $S_R$ comprises an indication of at least one assigned frequency spectrum segment for communication in the wireless communication system, communicate with at least one (e.g. assigned) network node of the radio communication network using the at least one assigned frequency spectrum segment.

By broadcasting the access signal $S_A$ rather than sending an access signal to a dedicated network node, it can be achieved that a plurality of network nodes receive this access signal $S_A$ and can accordingly evaluate this signal. Based on the received access signal, the network nodes can communicate with each other to determine at least one suitable frequency spectrum segment (e.g. fitting the UEs requirements and having currently a low load) to be used for the communication of the user device with the network. This frequency spectrum segment or these frequency spectrum segments are indicated to the user device in the access response signal $S_R$. Hence, embodiments of the present invention enable an efficient allocation of a user device to available frequency spectrum segments without the need for steps like cell detection, synchronization, initial signal strength measurements as performed in conventional systems. Thereby, the access procedure is speeded up and additional procedures to redirect a user device from a network node with a strong signal to a network node with a lower load can be avoided already from the beginning.

It is considered a wireless communication system where network nodes can be configured to operate in one or more frequency bands, with each frequency band being partitioned into a number of, in this disclosure called frequency spectrum segments. In LTE terminology, a spectrum segment may be a portion of a frequency component carrier or the entire frequency component carrier. In another example, a frequency spectrum segment may be a portion of the frequency band or the entire frequency band associated with a specific radio access technology (RAT) available at a network node. The frequency spectrum segments available at a network node may not necessarily be contiguous in the frequency domain nor have equal size (i.e., bandwidth). Further, the size of frequency spectrum segments at a network node can be static or dynamically configurable over time to adapt to e.g., load, traffic, demand or other network parameters related to frequency spectrum segments. Thereby, the overall frequency spectrum bandwidth available at a network node, eventually associated to multiple RATs, can be regarded as virtual spectrum bandwidth formed by multiple frequency spectrum segments.

Furthermore, it is considered that the access signal $S_A$ broadcasted by the user device does not have dedicated recipients (e.g. the access signal $S_A$ is free of a recipient address). Hence, the access signal $S_A$ can be understood as a beacon signal.

Moreover, an "or" in this description and the corresponding claims is to be understood as a mathematical OR which covers "and" and "or", and is not to be understand as an XOR (exclusive OR).

In a first possible implementation form of the user device according to the first aspect, the access signal $S_A$ further comprises at least one reference signal.

With the first possible implementation form, the radio communication network can detect the presence of the user device and make channel measurements associated with the user device on the basis of the reference signal in the access signal $S_A$. Based on the channel measurements, the radio communication network (e.g. a central network controller or an access node of the network) can assign a suitable frequency spectrum segment to the user device.

In a second possible implementation form of the user device according to the first aspect, the access signal $S_A$ further comprises one or more user device information in the group comprising: service type; subscription type; traffic type; amount of traffic needed; average or minimum or maximum data traffic needed; average or minimum or maximum bandwidth needed; supported radio access technologies; supported frequency bands; preferred frequency bands; supported frequency spectrum segments, and preferred frequency spectrum segments.

With the second possible implementation form an access signal with these characteristic enables the radio communication network to identify a new potential user device arriving into the communication system, acquire its requirements or type of service, and exploit this information to determine whether to admit the user device to the network and to which resources (e.g., frequency band(s), network node(s)) the new user device should be associated with. Therefore, this possible implementation form enables a communication system to admit a new user device by additionally considering its communication capabilities (e.g., supported RAT and frequency bands), and its service requirements (e.g., in terms of data rate, type of traffic, amount of traffic, etc.).

In a third possible implementation form of the user device according to the first aspect, the access response signal $S_R$ further indicates the identity of the at least one (assigned) network node; and wherein the transceiver further is configured to derive the identity of the at least one (assigned) network node based on the access response signal $S_R$.

The third possible implementation form enables fast admission control for the user device to frequency spectrum segments and network nodes when accessing the radio communication network.

In a fourth possible implementation form of the user device according to the first aspect, the transceiver is further configured to broadcast the access signal $S_A$ in a dedicated broadcast channel.

The fourth possible implementation form makes it possible to avoid collision and interference with other signals transmitted in the communication system thereby improving the reliability of successfully detecting and decoding the access signal and reducing the interference created by the broadcasted access signal with signals transmitted by other user devices already connected to the communication system. A further advantage is to reduce the search space for the receiver (network node(s)) thereby reducing complexity.

In a fifth possible implementation form of the user device according to the first aspect, the transceiver is further configured to broadcast the access signal $S_A$ in one or more separate frequency spectrum segments.

With the fifth possible implementation form the user device can announce its presence by broadcasting in different frequency spectrum segments. This enables the user device to be admitted to one or more frequency band(s) or radio access technologies available in the wireless communication system. In addition, it enables the radio communication network to acquire knowledge of the communication capabilities of the user device and thereby to admit the user device to communicate in the most suitable frequency spectrum segment and with the most suitable radio access technology.

According to a second aspect of the invention, the above mentioned and other objectives are achieved with a network node for a wireless communication system, the network node comprising a transceiver and a processor; wherein the transceiver is configured to receive a broadcasted access signal $S_A$ from a user device, wherein the broadcasted access signal $S_A$ comprises identity information of the user device; wherein the processor is configured to assign at least one frequency spectrum segment for communication for the user device based on the broadcasted access signal $S_A$; and wherein the transceiver is further configured to transmit an access response signal $S_R$ to the user device (in response to receiving the broadcasted access signal $S_A$), wherein the access response signal $S_R$ comprises an indication of the at least one assigned frequency spectrum segment for communication in the wireless communication system.

By receiving broadcasted access signals $S_A$ rather than only receiving access signals directly addressed to the network node, it can be achieved that a plurality of network nodes receive this access signal $S_A$ and can accordingly evaluate this signal, without the need for user device to establish a connection to the network node in advance. Based on the received access signal, the network node determine at least one suitable frequency spectrum segment (e.g. fitting the UEs requirements and having currently a low load) to be used for the communication of the user device with the network. This frequency spectrum segment or these frequency spectrum segments are indicated to the user device in the access response signal $S_R$. Hence, embodiments of the present invention enable an efficient allocation of a user device to available frequency spectrum segments without the need for steps like cell detection, synchronization, initial signal strength measurements as performed in conventional systems. Thereby, the access procedure is speeded up and additional procedures to redirect a user device from a network node with a strong signal to a network node with a lower load can be avoided already from the beginning.

In a first possible implementation form of the network node according to the second aspect, the access response signal $S_R$ further comprises, for the at least one assigned frequency spectrum segment, one or more network information in the group comprising: traffic types supported; amount of traffic supported; services supported; and network identity for at least one assigned network node.

The first possible implementation form enables the network node to associate a user device to a frequency spectrum segments or network node or radio access technology depending on the traffic type and amount of traffic supported by different frequency spectrum segments. The first possible implementation form further enables the network node to associate user devices to frequency spectrum segments based on the supported type of services.

In a second possible implementation form of the network node according to the second aspect, the processor is further configured to estimate a first communication performance indicator for a first available frequency spectrum segment at the network node based on the received broadcasted access signal $S_A$; wherein the transceiver is further configured to receive from at least a further network node of the wireless communication system a second communication performance indicator, wherein the second communication performance indicator is associated with the user device and a second available frequency spectrum segment at the further network node; wherein the processor is further configured to assign, based on the first communication performance indicator and the received second communication performance indicator (e.g. based on a comparison between these two communication performance indicators), the first frequency spectrum segment to the user device or the second frequency spectrum segment to the user device.

The second possible implementation form enables the radio communication network to assign frequency spectrum segments to the user device based on performance indicators achievable by the user device in different frequency spectrum segments at different network nodes.

In a third possible implementation form of the network node according to the second aspect, the processor is further configured to estimate for a plurality of available frequency spectrum segments at the network node a corresponding communication performance indicator based on the received broadcasted access signal $S_A$, and assign a frequency spectrum segment of the plurality of available frequency spectrum segments to the user device based on the estimated communication performance indicators.

The third possible implementation form enables the radio communication network to assign frequency spectrum segments to the user device based on performance indicator achievable by the user device in different frequency spectrum segments at the same network node.

In a fourth possible implementation form of the network node according to the second or third implementation forms of the second aspect, the communication performance indicator(s) comprise(s) one or more in the group comprising: achievable data rate; achievable maximum or minimum or average data rate; achievable spectral efficiency; achievable maximum or minimum or average spectral efficiency; achievable latency; achievable maximum or minimum or average latency; and maximum or minimum or average number of frequency resources.

The fourth possible implementation form enables assignment of the user device to network nodes and frequency spectrum segments based on the mentioned estimates.

In a fifth possible implementation form of the network node according to any of the second, third or fourth implementation forms of the second aspect, the processor is further configured to assign the at least one assigned frequency spectrum segment s* or the at least one assigned network node n*, based on any of the previous communication performance indicator(s), by satisfying one of the following criteria:

$$(n^*, s^*) = \arg\max_{n \in N(m), s \in S(n)} (W_n^s c_{m,n}^s / \lambda_n^s),$$

$$(n^*, s^*) = \arg\max_{n \in N(m), s \in S(n)} (c_{m,n}^s / \lambda_n^s),$$

$$(n^*, s^*) = \arg\max_{n \in N(m), s \in S(n)} (W_n^s / \lambda_n^s),$$

$$(n^*, s^*) = \operatorname{argmax}_{n \in N(m), s \in S(n)} \left( \alpha_n \frac{W_n^s c_{m,n}^s}{\lambda_n^s} - (1 - \alpha_n) E_n^s \right),$$

with $\alpha_n \in [0, 1]$, $$(n^*, s^*) = \operatorname{argmax}_{n \in N(m), s \in S(n)} \left( \alpha_n \frac{c_{m,n}^s}{\lambda_n^s} - (1 - \alpha_n) E_n^s \right),$$

with $\alpha_n \in [0, 1]$, $$(n^*, s^*) = \operatorname{argmax}_{n \in N(m), s \in S(n)} \left( \alpha_n \frac{W_n^s}{\lambda_n^s} - (1 - \alpha_n) E_n^s \right),$$

with $\alpha_n \in [0, 1]$, where $W_n^s$ is the size of frequency spectrum segment s available at network node n; $\lambda_n^s$ is the corresponding utilization indicated by network node n; $c_{m,n}^s$ is an estimate of the spectral efficiency provided by network node n in spectrum segment s for the user device m; $E_n^s$ is an indication of the energy cost for using frequency spectrum segment s at network node n; $\mathcal{N}(m)$ is a set of network nodes that received the broadcasted access signal $S_A$ from user device m; and $\mathcal{S}(n)$ is the set of frequency spectrum segment s available at network node $n \in \mathcal{N}(m)$.

The fifth possible implementation form enables a network node to make energy-aware selection of frequency spectrum segments to be activated or used for admitting new user devices into the communication system. Therefore, the response signal $S_R$ may further comprise an indication of at least one assigned network node for communication in the wireless communication system. The network node can associate a user device to a frequency spectrum segment(s) by trading off between energy cost of activating/using the frequency spectrum segment and expected data rate, spectral efficiency, or available frequency resources for the user device.

In a sixth possible implementation form of the network node according to the second aspect, the broadcasted access signal $S_A$ further comprises one or more user device information in the group comprising: service type, subscription type, traffic type, amount of traffic needed, average or minimum or maximum data traffic needed, average or minimum or maximum bandwidth needed, supported radio access technologies, supported frequency bands, and preferred frequency bands; supported frequency spectrum segments, and preferred frequency spectrum segments and wherein the processor is further configured to assign the at least one frequency spectrum segment based on the one or more user device information.

The sixth possible implementation form enables the network to assign a user device with one or more frequency spectrum segments, not necessarily co-located at the same network node, by comparing the achievable performance indicator for different frequency spectrum segments and/or network nodes. In other words, a user device is assigned to frequency spectrum segments and/or network nodes based not only on measurements of signal strength/quality at one or more network nodes, but also based on traffic load, size of different frequency spectrum segments available at different network nodes receiving a signal from the user device, etc. Additionally, the radio communication network can bundle different traffic services to different spectrum segments. For instance, this would enable a network operator to direct all user devices with a certain type of traffic (e.g., voice, video, etc) to be served by specific spectrum segments. It further allows a network operator to distinguish between uplink and downlink traffic demand.

In a seventh possible implementation form of the network node according to the second aspect, the transceiver is further configured to receive at least one network report message from one or more other network nodes, wherein the at least one network report message comprises one or more information elements associated with the user device in the group comprising: communication performance indicator, type of traffic, amount of traffic, average or minimum or maximum data traffic needed, average or minimum or maximum bandwidth needed, supported radio access technologies, supported frequency bands, preferred frequency bands, supported frequency spectrum segments, and preferred frequency spectrum segments; and wherein the processor is further configured to assign the at least one frequency spectrum segment to the user device based on the one or more information elements associated with the user device.

The seventh possible implementation form enables the radio communication network to improve the assignment of frequency spectrum segments to the user device by using the information elements associated with the user device.

In an eighth possible implementation form of the network node according to the second aspect, the transceiver is further configured to receive at least one network report message from one or more other network nodes, wherein the at least one network report message comprises one or more information elements associated with at least one available frequency spectrum segment at the one or more other network nodes in the group comprising: communication performance indicator, average received power, traffic load, utilisation level, bandwidth, and transmission power; and the processor is further configured to assign the at least one frequency spectrum segment to the user device based on the one or more information elements associated with the at least one available frequency spectrum segment at the one or more other network nodes.

The eighth possible implementation form enables the radio communication network to improve the assignment of frequency spectrum segments to the user device by using the information elements associated with at least one available frequency spectrum segment at the one or more other network nodes of the network.

According to a third aspect of the invention, the above mentioned and other objectives are achieved by a method in a user device for a wireless communication system, the method comprising:

broadcasting an access signal $S_A$ when not being connected to any radio communication networks, wherein the access signal $S_A$ comprises identity information of the user device;

receiving an access response signal $S_R$ from a radio communication network in response to broadcasting the access signal $S_A$, wherein the access response signal $S_R$ comprises an indication of at least one assigned frequency spectrum segments for communication in the wireless communication system;

communicating with at least one (e.g. assigned) network node of the radio communication network using the at least one assigned frequency spectrum segments.

In a first possible implementation form of the method in the user device according to the third aspect, the access signal $S_A$ further comprises at least one reference signal.

In a second possible implementation form of the method in the user device according to the third aspect, the access signal $S_A$ further comprises one or more user device information in the group comprising: service type; subscription type; traffic type; amount of traffic needed; average or minimum or maximum data traffic needed; average or minimum or maximum bandwidth needed; supported radio access technologies; supported frequency bands; preferred frequency bands; supported frequency spectrum segments; and preferred frequency spectrum segments.

In a third possible implementation form of the method in the user device according to the third aspect, the access response signal $S_R$ further indicates the identity of the at least one (assigned) network node; and the method further comprises deriving the identity of the at least one (assigned) network node based on the access response signal $S_R$.

In a fourth possible implementation form of the method in the user device according to the third aspect, the access signal $S_A$ is broadcasted in a dedicated broadcast channel.

In a fifth possible implementation form of the method in the user device according to the third aspect, the access signal $S_A$ is broadcasted in one or more separate frequency spectrum segments.

According to a fourth aspect of the invention, the above mentioned and other objectives are achieved by a method in a network node for a wireless communication system, the method comprising:

receiving a broadcasted access signal $S_A$ from a user device, wherein the broadcast access signal $S_A$ comprises identity information of the user device;

assigning at least one frequency spectrum segments for communication for the user device based on the broadcasted access signal $S_A$;

transmitting an access response signal $S_R$ to the user device (in response to receiving the broadcasted access signal $S_A$), wherein the access response signal $S_R$ comprises an indication of the at least one assigned frequency spectrum segments for communication in the wireless communication system.

In a first possible implementation form of the method in the network node according to the fourth aspect, the access response signal $S_R$ further comprises, for the at least one assigned frequency spectrum segment, one or more network information in the group comprising: traffic types supported; amount of traffic supported; services supported; and network identity for at least one assigned network node.

In a second possible implementation form of the method in the network node according to the fourth aspect, the method further comprises estimating a first communication performance indicator for a first available frequency spectrum segment at the network node based on the received broadcasted access signal $S_A$;

receiving from at least a further network node of the wireless communication system a second communication performance indicator, wherein the second communication performance indicator is associated with the user device and a second available frequency spectrum segment at the further network node;

assign, based on the first communication performance indicator and the received second communication performance indicator, the first frequency spectrum segment to the user device or the second frequency spectrum segment to the user device.

The second possible implementation form enables the radio network to assign frequency spectrum segments to the user device based on performance indicators achievable by the user device in different frequency spectrum segments.

In a third possible implementation form of the method in the network node according to the fourth aspect, the method further comprising estimating for a plurality of available frequency spectrum segments at the network node a corresponding communication performance indicator based on the received broadcasted access signal $S_A$, and assigning a frequency spectrum segment of the plurality of available frequency spectrum segments to the user device based on the estimated communication performance indicators.

The third possible implementation form enables the radio network to assign frequency spectrum segments to the user device based on performance indicator achievable by the user device in different frequency spectrum segments.

In a fourth possible implementation form of the method in the network node according to the second or third implementation forms of the fourth aspect, the communication performance indicator(s) comprise(s) one or more in the group comprising: achievable data rate; achievable maximum or minimum or average data rate; achievable spectral efficiency; achievable maximum or minimum or average spectral efficiency; achievable latency; achievable maximum or minimum or average latency; and maximum or minimum or average number of frequency resources.

The fourth possible implementation form enables assignment of the user device to network nodes and frequency spectrum segments based on the mentioned estimates.

In a fifth possible implementation form of the method in the network node according to any of the second, third or fourth implementation forms of the fourth aspect, the method further comprises assigning the at least one assigned frequency spectrum segment s* or the at least one assigned network node n*, based on any of the previous communication performance indicator(s), by satisfying one of the following criteria:

$$(n^*, s^*) = \arg\max_{n \in N(m), s \in S(n)} (W_n^s c_{m,n}^s / \lambda_n^s),$$

$$(n^*, s^*) = \arg\max_{n \in N(m), s \in S(n)} (c_{m,n}^s / \lambda_n^s),$$

$$(n^*, s^*) = \arg\max_{n \in N(m), s \in S(n)} (W_n^s / \lambda_n^s),$$

$$(n^*, s^*) = \operatorname{argmax}_{n \in N(m), s \in S(n)} \left( \alpha_n \frac{W_n^s c_{m,n}^s}{\lambda_n^s} - (1 - \alpha_n) E_n^s \right),$$

with $\alpha_n \in [0, 1]$, $$(n^*, s^*) = \operatorname{argmax}_{n \in N(m), s \in S(n)} \left( \alpha_n \frac{c_{m,n}^s}{\lambda_n^s} - (1 - \alpha_n) E_n^s \right),$$

with $\alpha_n \in [0, 1]$, $$(n^*, s^*) = \operatorname{argmax}_{n \in N(m), s \in S(n)} \left( \alpha_n \frac{W_n^s}{\lambda_n^s} - (1 - \alpha_n) E_n^s \right),$$

with $\alpha_n \in [0, 1]$, where $W_n^s$ is the size of frequency spectrum segment s available at network node n; $\lambda_n^s$ is the corresponding utilization indicated by network node n; $c_{m,n}^s$ is an estimate of the spectral efficiency provided by network node n in spectrum segment s for the user device m; $E_n^s$ is an indication of the energy cost for using frequency spectrum segment s at network node n; $\mathcal{N}(m)$ is a set of network nodes that received the broadcasted access signal $S_A$ from user device m; and $\mathcal{S}(n)$ is the set of frequency spectrum segment s available at network node $n \in \mathcal{N}(m)$.

The fifth possible implementation form enables a network node to make energy-aware selection of frequency spectrum segments to be activated or used for admitting new user devices into the communication system. Therefore, the response signal $S_R$ may further comprise an indication of at least one assigned network node for communication in the wireless communication system. The network node can associate a user device to a frequency spectrum segment(s) by trading off between energy cost of activating/using the frequency spectrum segment and expected data rate, spectral efficiency, or available frequency resources for the user device.

In a sixth possible implementation form of the method in the network node according to the fourth aspect, the broadcasted access signal $S_A$ further comprises one or more user device information in the group comprising: service type, subscription type, traffic type, amount of traffic needed, average or minimum or maximum data traffic needed, average or minimum or maximum bandwidth needed, supported radio access technologies, supported frequency bands, preferred frequency bands, supported frequency spectrum segments, and preferred frequency spectrum segments; and the method further comprises assigning the at least one frequency spectrum segment based on the one or more user device information.

In a seventh possible implementation form of the method in the network node according to the fourth aspect, the method further comprises receiving at least one network report message from one or more other network nodes, wherein the at least one network report message comprises one or more information elements associated with the user device in the group comprising: communication performance indicator, type of traffic, amount of traffic, average or minimum or maximum data traffic needed, average or minimum or maximum bandwidth needed, supported radio access technologies, supported frequency bands, preferred frequency bands, supported frequency spectrum segments, and preferred frequency spectrum segments; assigning the at least one frequency spectrum segment to the user device based on the one or more information elements associated with the user device.

In an eighth possible implementation form of the method in the network node according to the fourth aspect, the method further comprises receiving at least one network report message from one or more other network nodes, wherein the at least one network report message comprises one or more information elements associated with at least one available frequency spectrum segment at the one or more other network nodes in the group comprising: communication performance indicator, average received power, traffic load, utilisation level, bandwidth, and transmission power;

assigning the at least one frequency spectrum segment to the user device based on the one or more information elements associated with the at least one available frequency spectrum segment at the one or more other network nodes.

The advantages of the methods in a network node and in a user device are the same as those for the corresponding device claims.

It is further noted that the present invention also relates to a wireless communication system comprising at least one network node and at least one user device according to the present invention. Further, a corresponding method in a wireless communication system comprises the method in the network node and the method in the user device.

The present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Embodiments of the present invention enable the radio communication network comprising the present network nodes to configure a new user device wanting to access the radio communication network to operate into one or multiple frequency spectrum segments and/or with one or multiple radio access technologies bypassing several steps that are typically required by a user device in the related art, such as, cell detection, synchronization, initial signal strength measurements, thereby speeding up the access procedure and avoiding additional procedures to redirect a user device from a network node with a strong signal to a network node with lower load.

Additionally, by assigning user devices to frequency spectrum segments, rather than to physical (or logical) network nodes, resource scheduling is enabled in a so called virtual radio access network, where the identity of the radio network nodes serving a user device is not revealed to the user device.

Furthermore, embodiments of the present invention also enable the radio communication network to control and balance the distribution of traffic among multiple frequency spectrum segments, network nodes, and radio access technologies available in the wireless communication system based on the traffic expected from new admission queries to the wireless communication system, the current traffic distribution, the current spectrum utilization and the available spectrum.

Further applications and advantages of the present invention will be apparent from the following detailed description.

BRIEF DESCRIPTION OF THE DRAWINGS

The appended drawings are intended to clarify and explain different embodiments of the present invention, in which:

FIG. 7(a) and FIG. 7(b) are illustrate signalling between a user device and two network nodes or a network node and a network control node;

DETAILED DESCRIPTION

When network nodes in a radio communication system can be configured to operate in multiple frequency spectrum segments and/or with multiple radio access technologies, it is a problem to determine which frequency spectrum segments and/or which radio access technology a user device should be configured to operate in when accessing the system so as to comply with users' traffic/service demands, balance the traffic among frequency bands and minimize network's energy costs.

To solve these and other problems of conventional solutions embodiments of the present invention relate to a user device and a network node device.

Figure 1:
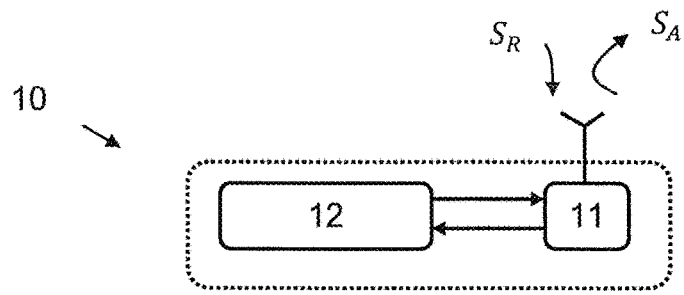
FIG. 1 shows a user device according to an embodiment of the present invention.

FIG. 1 shows a user device 10 according to an embodiment of the present invention. The user device 10 comprises a transceiver 11 configured to broadcast an access signal $S_A$ when not being connected to any radio communication networks. The access signal $S_A$ comprises identity information of the user device 10. In one example, the network identity information may comprise an indicator/number that univocally identifies the user device 10 for a certain radio access technology. In another example, the user device 10 may be in idle mode, non-connected mode, or at power on state (searching for the network) when not being connected to the radio communication network.

The transceiver 11 of the user device 10 is further configured to receive an access response signal $S_R$ from a radio communication network in response to broadcasting the access signal $S_A$. The access response signal $S_R$ comprises an indication of at least one assigned frequency spectrum segment by which the user device 10 can communicate in the wireless communication system. The transceiver 11 is also configured to communicate with at least one network node of the radio communication network using the at least one assigned frequency spectrum segment. The user device 10 shown in FIG. 1 also comprises a processor 12 in this example which is communicably coupled with the transceiver 11.

Figure 2:
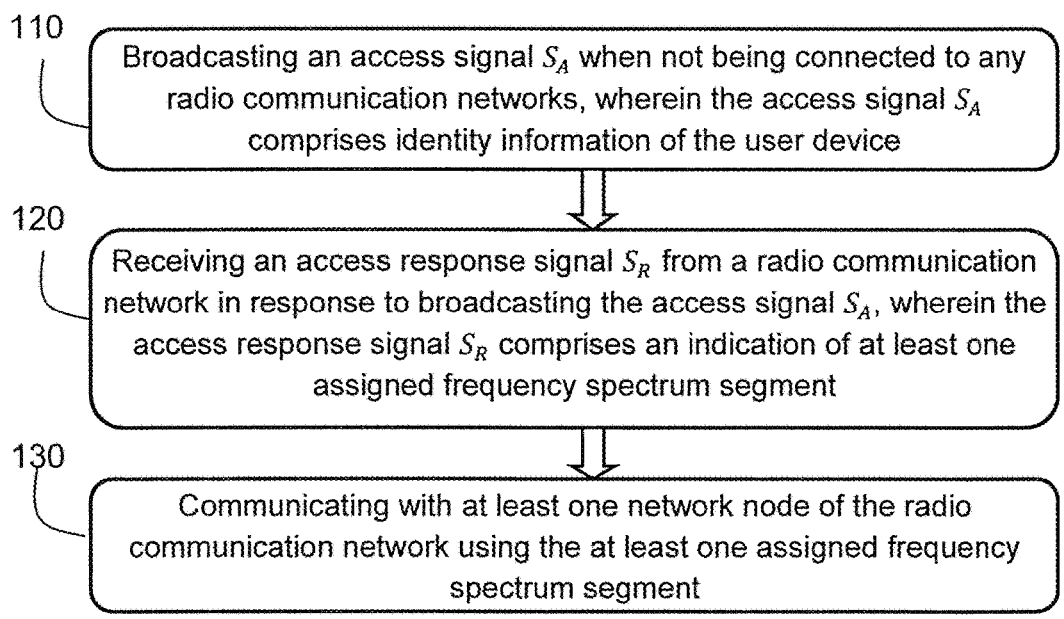
FIG. 2 shows a flow chart of a method in a user device according to an embodiment of the present invention.

A corresponding method for use in the user device 10 is shown in the flow chart of FIG. 2. The method comprises broadcasting 110 an access signal $S_A$ when the user device 10 is not connected to any radio communication networks, wherein the access signal $S_A$ comprises identity information of the user device 10. Furthermore, the method comprises: receiving 120 an access response signal $S_R$ from a radio communication network in response to broadcasting the access signal $S_A$, wherein the access response signal $S_R$ comprises an indication of at least one assigned frequency spectrum segment. Furthermore, the method comprises: communicating 130 with at least one network node of the radio communication network using the at least one assigned frequency spectrum segment.

Figure 3:
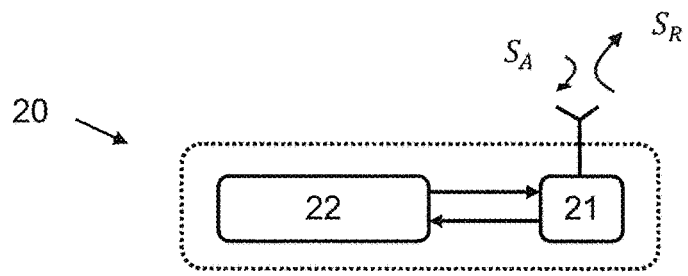
FIG. 3 shows a network node according to an embodiment of the present invention.

FIG. 3 shows a network node 20 according to an embodiment of the present invention. The network node 20 comprises a transceiver 21 and a processor 22 which are communicably coupled to each other. The transceiver 21 is configured to receive a broadcasted access signal $S_A$ from a user device 10, wherein the broadcasted access signal $S_A$ comprises identity information of the user device 10. The processor 22 is configured to assign at least one frequency spectrum segment for communication by the user device 10 based on the broadcasted access signal $S_A$. The transceiver 21 is further configured to transmit an access response signal $S_R$ to the user device 10 (in response to receiving the broadcasted access signal $S_A$), wherein the access response signal $S_R$ comprises an indication of the at least one assigned frequency spectrum segment.

Figure 4:
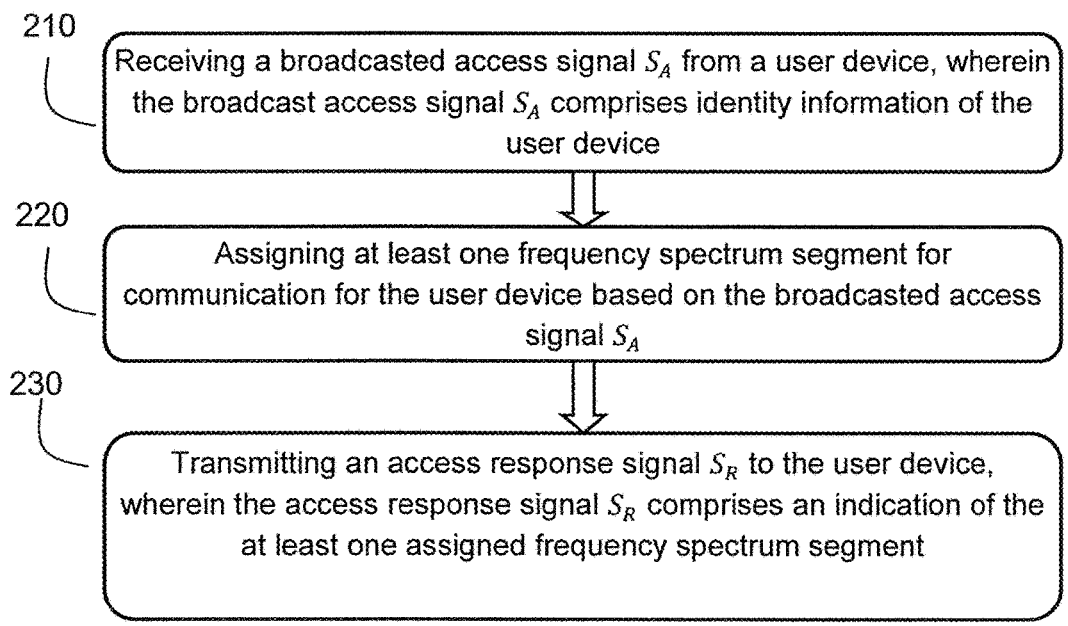
FIG. 4 shows a flow chart of a method in a network node according to an embodiment of the present invention.

A corresponding method for use in the network node 20 is shown in the flow chart of FIG. 4. The method comprises receiving 210 a broadcasted access signal $S_A$ from a user device 10, wherein the broadcast access signal $S_A$ comprises identity information of the user device 10. Furthermore, the method comprises assigning 220 at least one frequency spectrum segment for communication for the user device 10 based on the broadcasted access signal $S_A$. Furthermore, the method comprises transmitting 230 an access response signal $S_R$ to the user device (in response to receiving the broadcasted access signal $S_A$), wherein the access response signal $S_R$ comprises an indication of the at least one assigned frequency spectrum segment.

Figure 5:
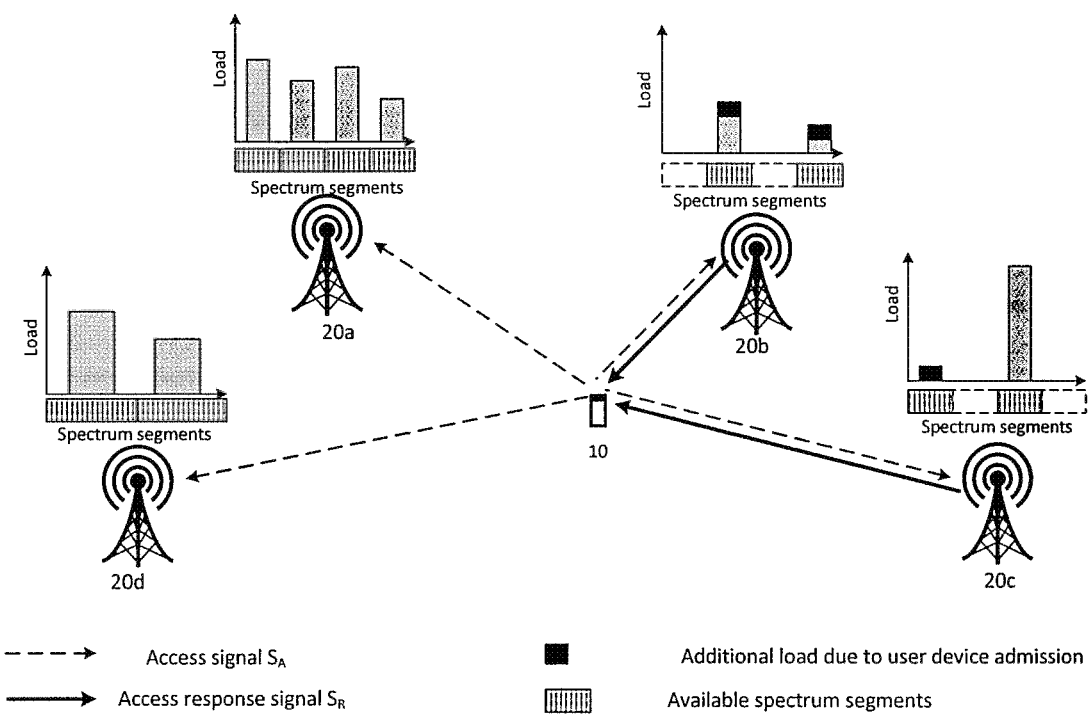
FIG. 5 illustrates a wireless communication system comprising embodiments of the present invention.

FIG. 5 shows an example in which the user device 10 broadcasts an access signal $S_A$ (illustrated with dashed arrows) which is received by network nodes 20a, 20b, 20c, 20d (which form possible implementation forms of the network node shown in FIG. 3). Network nodes 20b and 20c may each transmit an access response signal $S_R$ (illustrated with full arrows) to the user device 10. The user device 10 receives the access response signals $S_R$. In response to the reception of the access response signal $S_R$ the user device 10 starts communicating with network nodes 20b and 20c. It is further illustrated in FIG. 5 how the load (in black) of the user device 10 is added to the other loads of mentioned network nodes 20b and 20c, respectively. It can be seen that in this example how the user device 10 is assigned a second and a fourth available frequency spectrum segment at network node 20b and a first available spectrum segment at network node 20c. In this example, the network nodes 20b, 20c which transmit the access response signals $S_R$ are also the network nodes 20b, 20c to which the user device 10 establishes a connection to.

Figure 6:
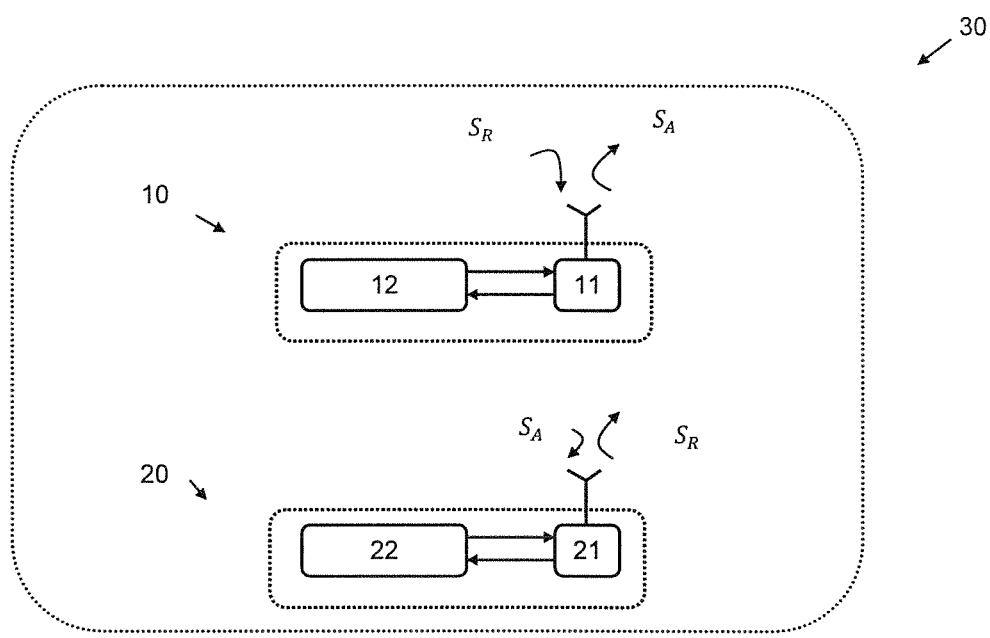
FIG. 6 illustrates signalling between a user device and a network node.

FIG. 6 illustrates the basic signalling in a wireless communication system 30 between the user device 10 and the network node 20. It can be seen that the user device 10 broadcasts the access signal $S_A$. The network node 20 receives the access signal $S_A$ and transmits an access response signal $S_R$ to the user device 10 in response. The user device 10 receives the access response signal $S_R$ and starts communicating using the assigned frequency spectrum segment(s).

Hence, a user device 10 wanting to access a communication network transmits an access signal $S_A$, for example, in at least one frequency spectrum segment without needing prior knowledge of, or prior synchronization to, any communication network in its proximity. The access signal $S_A$ is intended to announce the presence of the user device 10 to any communication network in the proximity of the user device 10 in at least a frequency spectrum segment and the desire of the user device 10 for accessing radio resources.

A communication network receiving an access signal $S_A$ from a user device 10 in at least one frequency band and at least one network node 20 of the communication network uses this access signal $S_A$ to determine which frequency spectrum segments, RAT(s) and network node(s) 20a, 20b, 20c, . . . , 20n should be used to serve the user device 10. This information is then transmitted in an access response signal $S_R$ to the user device 10. Upon receiving an access response signal $S_R$ from the communication network, the user device 10 may initiate a communication with the communication network (e.g. with one more network nodes of the communication network) using the indicated frequency spectrum segment(s).

The assignment of a user device 10 to one or more frequency spectrum segments and/or radio access technologies is realized taking into account performance metric(s), such as average data rate, average spectral efficiency, latency, etc., representing the service that can be provided to the user device 10 by different network nodes in the system using in different frequency bands and/or radio access technologies.

Contrary to conventional solutions, the admission of a new user device 10 into a communication network and association with at least one frequency spectrum segment (and a corresponding network node) is not only based on the received signal strengths of signals sent from the user device 10 to and measured at the individual network nodes of the communication network 20a, 20b, 20n, but rather based on the traffic load/congestion of the individual network nodes in the supported different frequency spectrum segments (possibly even in different frequency bands and/or radio access technologies).

In an embodiment of the present invention, the access signal $S_A$ also comprises at least one reference signal which is known to the receiver(s), i.e. the network node(s). The reference signal can be time- or frequency multiplexed with the part of the broadcast access signal comprising identity information of the user device 10. In one example, a reference signal is transmitted after a time gap from the broadcast access signal $S_A$ comprising identity information of the user device 10. This has the advantage of enabling the communication network to first detect the presence of the user device 10 and then to make channel measurements associated with the user device 10 on the basis of the reference signal. To this end, the reference signal could be characterized by a transmitted sequence that depends on the user device identity information.

In an embodiment of the present invention, the access signal $S_A$ further comprises one or more user device information associated with the user device 10 in the group of:
Service type;
Subscription type;
Type (e.g., uplink, downlink, voice, video, streaming, etc.) of traffic needed;
Amount of traffic needed;
Average/maximum/minimum data traffic needed;
Average/maximum/minimum amount of radio resources needed;
Supported radio access technology capabilities of the user device;
Supported frequency spectrum segments or supported frequency bands;
Preferred frequency spectrum segments or preferred frequency bands.

An access signal $S_A$ from the user device 10 with these characteristic enables the communication network to identify a new potential user device 10 arriving into the communication system, acquire the requirements of the user device or type of service, and exploit this information for determining whether to admit the user device 10 to the communication network and to which resources (e.g., frequency spectrum segments and frequency band(s), network node(s)) the new user device 10 should be associated with.

Therefore, the method has the benefit to enable a communication network to admit a new user device 10 by additionally considering the communication capabilities (e.g., supported RAT and frequency bands) of the user device 10, the service requirements of the user device 10 (e.g., in terms of data rate, type of traffic, amount of traffic, etc.). For instance, time-frequency resources for transmitting an access signal could be predefined by specification depending on the radio access technology and thereby being known to both transmitter (e.g., a user device) and receiver (e.g., a network node).

In an embodiment of the present invention, a network node 20 transmits to the user device 10 an access response signal $S_R$ further comprising one or more network information in the group comprising:
traffic types supported;
amount of traffic supported;
services supported; and
network identity for at least one assigned network node.

Similarly to the access signal $S_A$, time-frequency resources for transmitting an access response signal $S_R$ could be predefined by specification depending on the radio access technology, or be the same used by the spectrum access signal, thereby being known to both the transmitter and the receiver.

In an embodiment of the present invention, the access response signal $S_R$ transmitted by a network node 20 is dedicated for a specific user device 10. This can be realized, for instance, by modulating the message with a modulation sequence generated based on an indicator of the user device 10 identity. The benefit of this is to enable only the intended user device 10 to receive and decode the access response signal $S_R$.

In an embodiment of the present invention, a network node transmits information elements, associated with the user device 10, in a network report message to at least one other network node 20 (e.g. a network control node) in the group comprising: communication performance indicator, type of traffic, amount of traffic, average or minimum or maximum data traffic needed, average or minimum or maximum bandwidth needed, supported radio access technologies, supported frequency bands, preferred frequency bands, supported frequency spectrum segments, and preferred frequency spectrum segments.

In an embodiment of the present invention, a network node 20 transmits information elements, associated with at least one available frequency spectrum segment at one or more other network nodes 20a, 20b, 20c, . . . , 20n, in a network report message to at least one other network node (e.g. a network control node) in the group comprising: communication performance indicator, average received power, traffic load, utilisation level, bandwidth, and transmission power.

The assignment problem (of assigning the user device 10 to at least one frequency spectrum segment and/or to at least one network node) can be solved either individually by each network node as illustrated in FIG. 7(a) or centrally by a network control node as illustrated in FIG. 7(b).

In FIG. 7(a), a user device 10 broadcasts an access signal $S_A$ that is received by one or more network nodes 20a, 20b, 20c, . . . , 20n. Each network node 20 receiving the broadcast access signal can estimate a performance indicator for the user device 10 in at least one frequency spectrum segment. Upon exchanging report messages among the network nodes carrying information related to the user device 10 and/or information related to the network nodes 20a, 20b, 20c, . . . , 20n, each network node can individually determine an association of frequency spectrum segments and network nodes for the user device as indicated in the "solve assignment problem" boxes. An access response signal $S_R$ is then transmitted by at least one of the network nodes (for instance, by the network node(s) to which the user device has been associated) to the user device 10.

In FIG. 7(b), a user device 10 broadcasts an access signal $S_A$ that is received by one or more network nodes 20a, 20b, 20c, . . . , 20n. The network nodes which receive the access signal $S_A$ transmit corresponding report messages to a (common) network control node. Based on the report messages, the network control node determines an association of at least one frequency spectrum segments and at least one network node for the user device 10 as indicated in the "solve assignment problem" box. The association is then indicated to the intended network node(s) as frequency spectrum assignment signal (a). The intended network node(s) transmit a corresponding access response signal $S_R$ to the user device 10.

Therefore, a network node and/or a network control node controlling or coordinating the operation of a group of network nodes 20a, 20b, 20c, . . . , 20n is enabled to collect information, such as estimates of the achievable performance, type and/or amount of traffic etc., associated with a user device 10 with respect to at least a frequency spectrum segment at one or more other network nodes 20a, 20b, 20c, . . . , 20n. With this information, a network node or a network control node determines best assignment of frequency spectrum segments for the user device 10 solving an assignment problem according to previous embodiments. Furthermore, the network nodes 20a, 20b, 20c, . . . , 20n can exchange mentioned information for improving assignment of frequency spectrum segments and/or network nodes.

The load or utilization of an available frequency spectrum segment (or even of a complete available frequency band) at a network node 20 may be represented by: an estimate of the (average/minimum/maximum) traffic load; an estimate of the (average/minimum/maximum) number of user devices admitted to said frequency spectrum segment; an estimate of the (average/minimum/maximum) number of user devices admitted to at least a frequency spectrum segment and actively scheduled for communication. In addition the load of the available frequency spectrum segment may include an indication of the load variance.

An estimate of the average offered load or traffic intensity at a frame level is the product of the average frame arrival rate and the frame processing and transmission time, and at service level is the product of the average service request arrival rate (or user arrival rate) and the average service time. This information enables a user device 10 to estimate the average per-user spectral efficiency offered in a certain frequency band by a network node. By additionally indicating the frequency bandwidth, a user device 10 is enabled to estimate the average data throughput achievable in a certain frequency band.

In an embodiment of the present invention, a network node is a network control node controlling the utilization of frequency spectrum segments and/or radio access technologies for a plurality of network nodes in the communication network. The network control node can be a network node residing in the radio access network (RAN) of the communication system (e.g., a base station, a NodeB, and enhanced NodeB, and ultra NodeB (uNodeB), etc.), or a network node in the core network part of the communication system.

Figure 8:
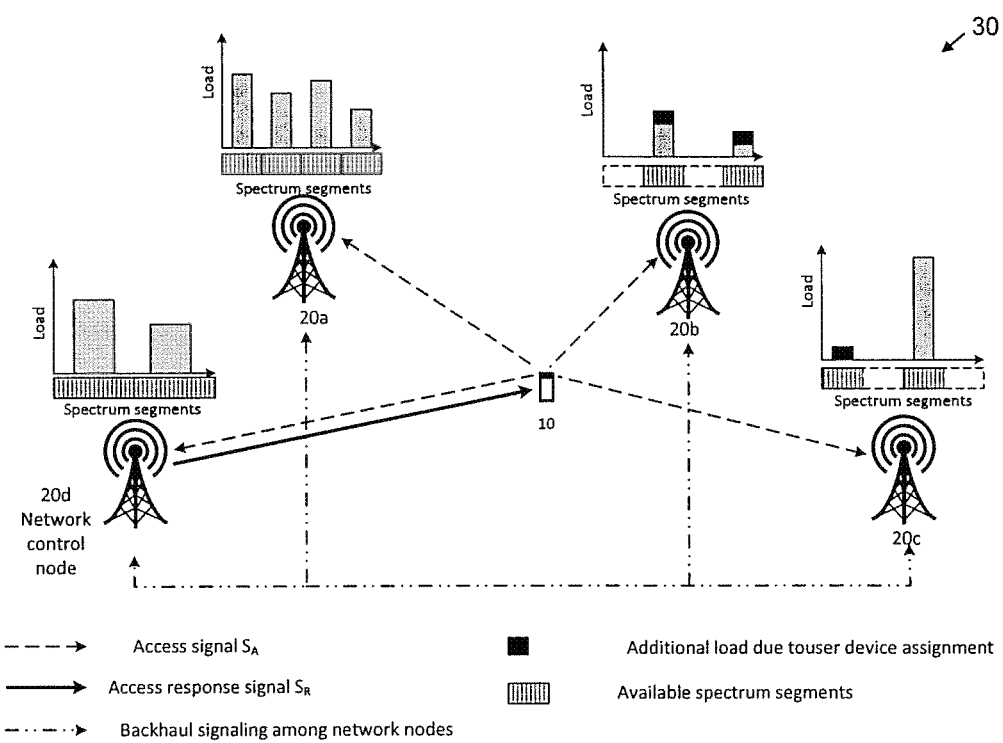
FIG. 8 illustrates a further wireless communication system comprising embodiments of the present invention.

FIG. 8 illustrates an example of a communication system 30 comprising a plurality of network nodes 20a, 20b, 20c, 20d and an exemplarily user device 10. One network node 20d of the communication system 30 is a network control node. The user device 10 broadcasts an access signal $S_A$ in the communication system 30. This access signal $S_A$ is received by every network 20a, 20b, 20c, 20d in reach. The network control node 20d exchanges network report messages (such as signal strengths derived from the access signal $S_A$ and load of available frequency spectrum segments) via a backhaul link with the other network nodes 20a, 20b, 20c which is illustrated with the dashed and dotted arrows. In this example, the network control node 20d transmits an access response signal $S_R$ indicating to the user device 10 an assignment to two different frequency spectrum segments at network node 20b and to one frequency spectrum segment at network node 20c. The user device 10 starts communicating with network nodes 20b and 20c and it is illustrated in FIG. 8 how the load (in black) of the user device 10 is added to the loads of mentioned network nodes 20b and 20c, respectively. In other words, the network control node 20d is configured to assign the user device 10 at the same time to at least two different frequency spectrums at least two different network nodes 20b, 20c. These two network nodes can both be different from the network control node 20d. The control node 20d is configured to indicate the assignment to the user device 10 in the access response signal $S_R$. Furthermore, the user device 10 is configured to receive the access response signal $S_R$ from the network control node 20d and to establish a connection with the two network nodes 20b, 20c using the corresponding frequency spectrum segments indicated in the access response signal $S_R$.

Figure 9:
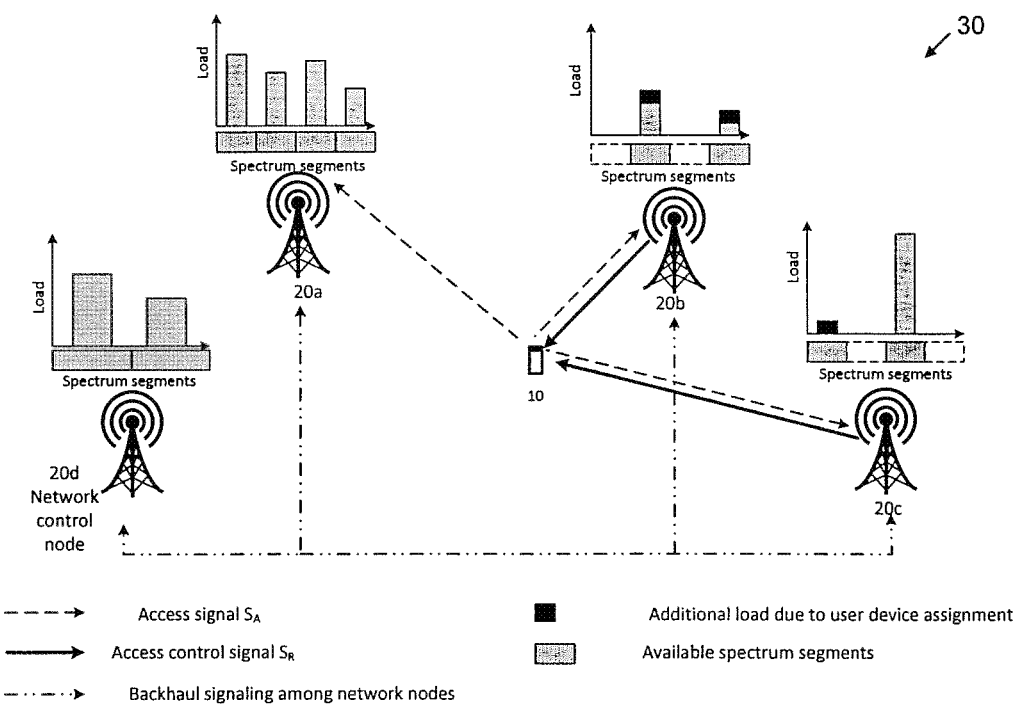
FIG. 9 illustrates a yet further wireless communication system comprising embodiments of the present invention.

FIG. 9 shows an example of a communication system 30 comprising a plurality of network nodes 20a, 20b, 20c, 20d and an exemplarily user device 10. One network node 20d of the communication system 30 is a network control node. The user device 10 broadcasts an access signal $S_A$ in the communication system 30 which is received by network nodes 20a, 20b, 20c. From this example it can be seen, that not necessarily that the control node 20d has to receive the access signal $S_A$, as it is sufficient that at least another network node 20a, 20b, 20c (which is not a control node) receives such access signal $S_A$ from the user device 10 and reports such a reception to the network control node 20d. Therefore, the network control node does not necessarily need to be in reach of the user device 10. The network control node 20d exchanges network report messages via a backhaul link with the other network nodes 20a, 20b, 20c which is illustrated with the dashed and dotted arrows. In this example, the network control node 20d determines the assignment of the user device 10 two different frequency spectrum segments at network node 20b and to one frequency spectrum segment at network node 20c. This assignment is reported to the assigned network nodes 20b, 20c. The network nodes 20b and 20c thereafter each transmits an access response signal $S_R$ indicating to the user device 10 an assignment to the corresponding frequency spectrum segments at the corresponding network node 20b, 20c. The user device 10 then initiates a communication with the network nodes 20b and 20c using the assigned frequency spectrum segments. Furthermore, it is illustrated in FIG. 9 how the load (in black) of the user device 10 is added to the load of mentioned network nodes 20b and 20c, respectively. The example in FIG. 9 differs further from the example in FIG. 8, as in the example in FIG. 9 the network nodes which are assigned to the user device 10 themselves transmit the access response signal $S_R$ (indicating also the assigned frequency spectrum segments at the network node 10) to the user device 10. This has the advantage that a load of the network control node 20 is reduced. In contrast to this, in the example in FIG. 8, the network control node transmits the access response signal $S_R$ to the user device 10. This has the advantage that even for an assignment of the user device 10 to a plurality of network nodes at the same time, only one access response signal $S_R$ is sufficient.

Figure 10:
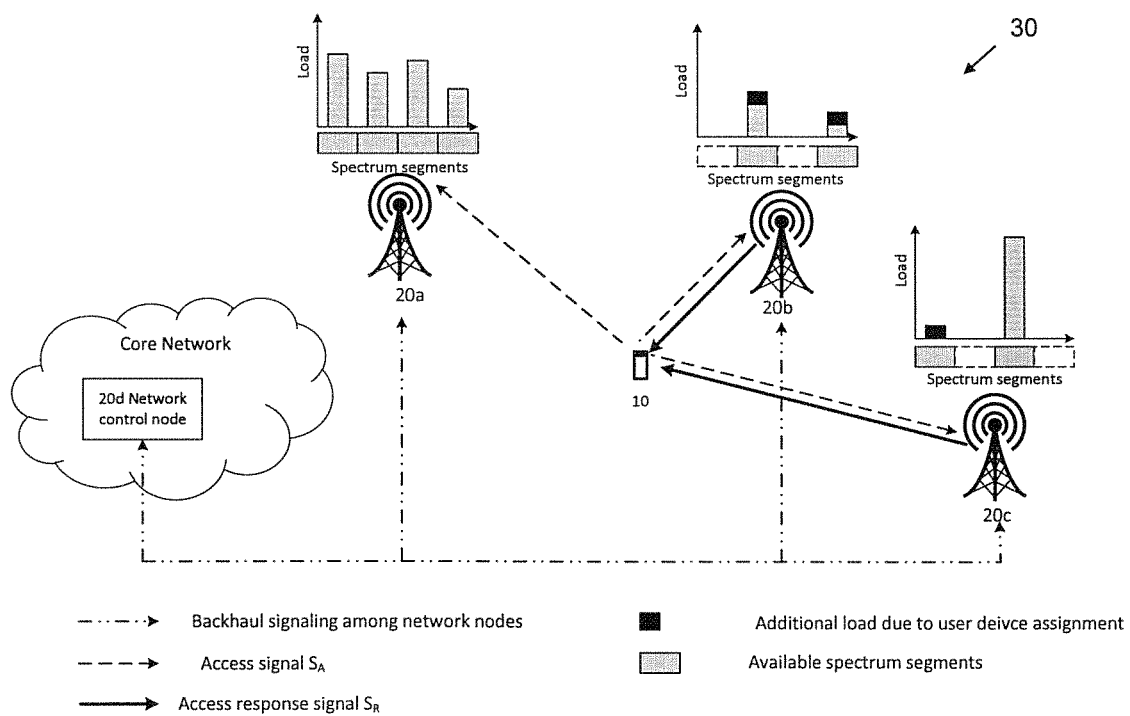
FIG. 10 illustrates a yet further wireless communication system comprising embodiments of the present invention.

FIG. 10 illustrates a communication system 30 which differs from the communication system shown in FIG. 9 in that the network control node 20d resides in the core network side of the wireless communication system 30. The user device 10 broadcasts an access signal $S_A$ in the communication system 30 which is received by network nodes 20a, 20b, 20c. The network control node 20d exchanges network report messages via a backhaul link with the other network nodes 20a, 20b, 20c which is illustrated with the dashed and dotted arrows. In this example, the network control node 20d determines the assignment of a user device 10 to at least a frequency spectrum segment and reports this to the network nodes 20a, 20b, 20c. The network nodes 20b and 20c each transmits an access response control signal $S_R$ indicating to the user device 10 an assignment to at least one frequency spectrum segment. The user device 10 starts communicating with network nodes 20b and 20c and it is illustrated in FIG. 10 how the load (in black) of the user device 10 is added to the load of mentioned network nodes 20b and 20c, respectively.

In an embodiment of the present invention, the network node 20 determines the assignment of a user device 10 to a frequency spectrum segment available in at least one network node of the communication system based on one or more communication performance indicators (which the network node 20 for example estimates based on the received access signal $S_A$) in the group of:
  achievable data rate;
  achievable maximum or minimum or average data rate;
  achievable spectral efficiency;
  achievable maximum or minimum or average spectral efficiency;
  achievable latency;
  achievable maximum or minimum or average latency; and
  maximum or minimum or average number of frequency resources.

In an embodiment of the present invention, the network node 20 determines the assignment of a user device 10 to at least a frequency spectrum segment available in at least one network node of the communication system 30 based on one or more user device 10 information associated with the user device 10 in the group comprising:
  service type,
  subscription type, traffic type,
  amount of traffic needed,
  average or minimum or maximum data traffic needed,
  average or minimum or maximum bandwidth needed,
  supported radio access technologies,
  supported frequency spectrum segments or supported frequency bands, and
  preferred frequency spectrum segments or preferred frequency bands.

One benefit is to enable the communication network to associate a user device 10 with one or more frequency spectrum segments, not necessarily collocated at the same network node, by comparing the achievable performance indicator for different frequency spectrum segments and/or network nodes. In other words, a user device 10 is associated to frequency spectrum segment and/or network nodes based not only on measurements of signal strength/quality at one or more network nodes, but also based on the traffic load, the size of different frequency spectrum segments available at different network nodes receiving a signal from the user device, etc.

Additionally, the method enables the network to bundle different traffic services to different spectrum segments. For instance, this would enable a network operator to direct all user devices with a certain type of traffic (e.g., voice, video, etc.) to be served by specific spectrum segments. It further allows a network operator to distinguish between uplink and downlink traffic demand.

In an embodiment of the present invention, a network node assigns at least one frequency spectrum segment s, and a corresponding network node n, with a user device m based on one or more communication performance indicators in the group comprising:
  achievable data rate; achievable maximum or minimum or average data rate;
  achievable spectral efficiency;
  achievable maximum or minimum or average spectral efficiency;
  achievable latency; achievable maximum or minimum or average latency; and
  maximum or minimum or average number of frequency resources.

In other words, a network node 20 assigns at least one frequency spectrum segment s, and a corresponding network node n, with a user device m by comparing the aforementioned performance indicators for the user device 10 with respect to different network nodes and spectrum segments and selecting the pair (n*,s*) satisfying one of the following criteria $$(n^*, s^*) = \arg\max_{n \in N(m), s \in S(n)} (W_n^s c_{m,n}^s / \lambda_n^s), \quad (1)$$

$$(n^*, s^*) = \arg\max_{n \in N(m), s \in S(n)} (c_{m,n}^s / \lambda_n^s), \quad (2)$$

$$(n^*, s^*) = \arg\max_{n \in N(m), s \in S(n)} (W_n^s / \lambda_n^s), \quad (3)$$

where $W_n^s$ represents the size of spectrum segment s available at network node n, $\lambda_n^s$ the corresponding utilization indicated by network node n (e.g., traffic load, average/minimum/maximum number of user devices scheduled, etc.), while $c_{m,n}^s$ a estimate of the spectral efficiency provided by network node n in spectrum segment s for user device m.

Furthermore, $\mathcal{N}$ (m) is a set of network nodes relevant for user device m, while $\mathcal{S}$ (n) is the set of frequency spectrum segments s available at network node n∈$\mathcal{N}$ (m). Therefore:

The quantity $W_n^s c_{m,n}^s/\lambda_n^s$ represents an estimate of the average data throughput achievable by the user device in spectrum segment s at network node n;

The quantity $c_{m,n}^s/\lambda_n^s$ represents an estimate of the average spectral efficiency achievable by the user device in spectrum segment s at network node n;

The quantity $W_{m,n}^s/\lambda_n^s$ represents an estimate of the average number of frequency resources obtainable by the user device in spectrum segment s at network node n.

It is further disclosed that eq. (1) solves the following integer linear program (ILP) problem $$\text{maximize} \sum_{n \in N(m)} \sum_{s \in S(n)} x_{m,n}^s \frac{W_n^s c_{m,n}^s}{\lambda_n^s} \quad (4)$$

$$\text{subject to} \sum_{n \in N(m)} \sum_{s \in S(n)} x_{m,n}^s \leq K_m$$

$$x_{m,n}^s \in \{0, 1\} \forall n \in \mathcal{N}(m), s \in \mathcal{S}(n),$$

where the decision variable $x_{m,n}^s \in \{0,1\}$ is equal to one if user device m is associated with spectrum segment s at a network node n, zero otherwise. The inequality constraint states that a user device can be associated with up to $K_m$ spectrum segments. To realize the disclosed method, network nodes shall coordinate by at least exchanging a report message with information related to one or more of: $c_{m,n}^s$, $\lambda_n^s$ $W_{m,n}^s$, $W_n^s c_{m,n}^s/\lambda_n^s$, $c_{m,n}^s/\lambda_n^s$, $W_n^s/\lambda_n^s$. A The skilled reader may realize that by replacing $$\frac{W_n^s c_{m,n}^s}{\lambda_n^s}$$

in the objective function with a continuous, monotonic function of $$\frac{W_n^s c_{m,n}^s}{\lambda_n^s},$$

e.g.

$$u_{m,n}^s = \log \frac{W_n^s c_{m,n}^s}{\lambda_n^s},$$

yields the same result.

It is further disclosed that the assignment problem in eq. (4) can be solved either individually by each network node or centrally by a network control node as illustrated in FIGS. 7(a) and 7(b), respectively.

The optimal choice of frequency spectrum segments (and network nodes) for the user device 10 consists of the best k∈[1,$K_m$] spectrum segments found via eq. (1). The problem in eq. (4) can be modified by adding constraints on the minimum and/or maximum average data throughput, such as $$r_{m,min} \leq \sum_{n \in N(m)} \sum_{s \in S(n)} x_{m,n}^s \frac{W_n^s c_{m,n}^s}{\lambda_n^s} \leq r_{m,max},$$

in which case the network node associates the user device with the best k∈[1,$K_m$] spectrum segments yielding an aggregate average data rate in the range [$r_{m,min}$,$r_{m,max}$]. Thus, the method enables to determine the best frequency spectrum segment(s), and the corresponding network node(s), to serve a user device so as to maximize its average data throughput. In addition, by taking into account the traffic load of different spectrum segments at different network nodes, the method enables admission of user devices to spectrum segments with lower utilization, thereby balancing the inter-frequency load at the network nodes.

A skilled reader can recognize that eq. (2) and (3) can be used to solve similar problems with similar consideration, where the corresponding problem can be formulated by replacing the objective function in eq. (4) accordingly.

In an embodiment of the present invention, a network node n assigns a user device m with at least one of its available frequency spectrum segment s, without coordinating with other network nodes, as the spectrum segment satisfying:

$$s^* = \arg\max_{s \in S(n)} (W_n^s c_{m,n}^s / \lambda_n^s). \quad (5)$$

$$s^* = \arg\max_{s \in S(n)} (c_{m,n}^s / \lambda_n^s) \quad (6)$$

$$s^* = \arg\max_{s \in S(n)} (W_n^s / \lambda_n^s) \quad (7)$$

With similar arguments, it possible to prove that in the absence of coordination among network nodes, eq. (5) solves the following integer linear programming (ILP) problem $$\text{maximize} \sum_{s \in S(n)} x_m^s \frac{W_n^s c_{m,n}^s}{\lambda_n^s} \quad (8)$$

$$\text{subject to} \sum_{s \in S(n)} x_m^s \leq K_m$$

$$x_m^s \in \{0, 1\} \forall s \in \mathcal{S}(n).$$

A network node 20 determines the optimal assignment of frequency spectrum segments for the user device by selecting the best k∈[1,$K_m$] spectrum segments through eq. (5).

The problem in eq. (8) can also be modified by adding constraints on a minimum and/or maximum average data rate, so that the network node associates the user device with the best k∈[1,$K_m$] spectrum segments yielding an aggregate average data rate in the range [$r_{m,min}$,$r_{m,max}$]. Compared to the previous embodiments of the present invention, this embodiment has the advantage of not requiring coordination among network nodes and reduced signalling overhead.

Equations (6) and (7) solve similar problems, with the corresponding problem being formulated as eq. (8) by replacing the objective function accordingly.

In an embodiment of the present invention, a network node assigns at least one frequency spectrum segment s, and a corresponding network node n, with a user device in based on an energy cost and either an estimate of either the average throughput or the average spectral efficiency achievable at different network nodes and spectrum segment s, as the pair (n*,s*) satisfying respectively $$(n^*, s^*) = \mathrm{argmax}_{n \in N(m), s \in S(n)} \left( \alpha_n \frac{W_n^s c_{m,n}^s}{\lambda_n^s} - (1-\alpha_n) E_n^s \right), \quad (9)$$

with $\alpha_n \in [0, 1]$, $$(n^*, s^*) = \mathrm{argmax}_{n \in N(m), s \in S(n)} \left( \alpha_n \frac{c_{m,n}^s}{\lambda_n^s} - (1-\alpha_n) E_n^s \right), \quad (10)$$

with $\alpha_n \in [0, 1]$, $$(n^*, s^*) = \mathrm{argmax}_{n \in N(m), s \in S(n)} \left( \alpha_n \frac{W_n^s}{\lambda_n^s} - (1-\alpha_n) E_n^s \right), \quad (11)$$

with $\alpha_n \in [0, 1]$, where, $\lambda_n^s$ the utilization of a frequency spectrum s available at network node n, $c_{m,n}^s$ is a estimate of the spectral efficiency provided by network node n in spectrum segment s for user device m, and $E_n^s$ is an indication of the energy cost for using spectrum segment s at network node n. The coefficient $\alpha_n \in [0,1]$ allows to trading the prioritization of high data throughput (i.e., equation (9)) or spectral efficiency (i.e., equation (10)) of the user device for the energy efficiency of the spectrum utilization. Thus, the method enables to account for network energy saving when assigning frequency spectrum segments to user devices.

In the special case in which a network node n associates a user device in to at least one of its available frequency spectrum segment s without coordinating with other network nodes, eq. (9) and (10) can be simplified, respectively, as $$s^* = \mathrm{argmax}_{s \in S(n)} \left( \alpha \frac{W_n^s c_m^s}{\lambda_n^s} - (1-\alpha) E_n^s \right), \quad (12)$$

with $\alpha \in [0, 1]$, $$s^* = \mathrm{argmax}_{s \in S(n)} \left( \alpha \frac{c_m^s}{\lambda_n^s} - (1-\alpha) E_n^s \right), \quad (13)$$

with $\alpha \in [0, 1]$, $$s^* = \mathrm{argmax}_{s \in S(n)} \left( \alpha \frac{W_n^s}{\lambda_n^s} - (1-\alpha) E_n^s \right), \quad (14)$$

with $\alpha \in [0, 1]$,

In an embodiment of the present invention the network node 20 estimates a first communication performance indicator for a first available frequency spectrum segment at the network node based on the received broadcasted access signal $S_A$. Thereafter the network node 20 receives from at least one further network node a second communication performance indicator which is associated with the user device 10 and a second available frequency spectrum segment at the further network node. Finally, the network node 20 assigns the first frequency spectrum segment or the second frequency spectrum segment to the user device 10 based on the first communication performance indicator and the received second communication performance indicator.

In an embodiment of the present invention the network node 20 estimates for a plurality of available frequency spectrum segments at the network node a corresponding communication performance indicator based on the received broadcasted access signal $S_A$. Thereafter, the network node 20 assigns a frequency spectrum segment of the plurality of available frequency spectrum segments to the user device 10 based on the estimated communication performance indicators.

In one embodiment of the present invention, the network node 20 receives a network report message from one or more other network nodes. The network report message comprises one or more information elements associated with the user device 10 in the group comprising: communication performance indicator, type of traffic, amount of traffic, average or minimum or maximum data traffic needed, average or minimum or maximum bandwidth needed, supported radio access technologies, supported frequency spectrum segments, and preferred frequency spectrum segments. Based on the one or more information elements associated with the user device 10 the network node 20 assigns frequency spectrum segment(s) to the user device 10.

In one embodiment of the present invention, the network node 20 receives a network report message from one or more other network nodes. The network report message comprises one or more information elements associated with at least one available frequency spectrum segment at the one or more other network nodes in the group comprising: communication performance indicator, average received power, traffic load, utilisation level, bandwidth, and transmission power. Based on the one or more information elements with at least one available frequency spectrum segment at the one or more other network nodes, the network node assigns frequency spectrum segment(s) to the user device 10.

The above embodiments of the present invention relate to inter-network information exchange between the network nodes 20a, 20b, 20c, . . . , 20n of the radio communication network for assigning frequency spectrum segments to user devices. Also these embodiments of the invention can be understood by the FIGS. 8-10 where the different network nodes 20a, 20b, 20c, 20d are configured to exchange different network report messages.

Embodiments of the network node 20 according to the present invention may as explained above be a network control node or a network node of a radio communication network (as shown in FIGS. 8 and 9) but can also be part of the core network of the wireless communication system 30 (as shown in FIG. 10). The network control node could e.g., be a NodeB in a radio access network or a logical node in core network, such as the operation administration maintenance (OAM) node in an LTE system, a Mobility Management Entity (MME), or a radio control node.

Embodiments of the present user device 10 according to the present invention may be any wireless communication device with the capabilities to communicate with a radio communication network, such as UEs in LTE systems. The user device 10 can e.g., be a laptop, mobile phone, tablet computer, smart phone, etc.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present devices, network node device and user device, comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A user device m for a wireless communication system, the user device m comprising:
   a transceiver configured to:
      broadcast an access signal $S_A$ when not being connected to any radio communication network, the access signal $S_A$ configured to be received by at least a first network node and a second network node, wherein the access signal $S_A$ comprises identity information of the user device m;
      receive an access response signal $S_R$ from a radio communication network in response to broadcasting the access signal $S_A$, wherein the access response signal $S_R$ comprises an indication of at least one assigned frequency spectrum segment s* for communication in the wireless communication system, wherein the at least one assigned frequency spectrum segment s* is assigned by the radio communication network based on (i) a first communication performance indicator estimated at the first network node based on the broadcasted access signal $S_A$, and (ii) a second communication performance indicator estimated at the second network node based on the broadcasted access signal $S_A$; and
      communicate with at least one network node of the radio communication network using the at least one assigned frequency spectrum segment s*;
   wherein the at least one assigned frequency spectrum segment s* or at least one assigned network node n* is assigned based on any of the first and second communication performance indicators, and in satisfaction of one of the following criteria:

$$(n^*, s^*) = \arg\max_{n \in N(m), s \in S(n)} (W_n^s c_{m,n}^s / \lambda_n^s),$$

$$(n^*, s^*) = \arg\max_{n \in N(m), s \in S(n)} (c_{m,n}^s / \lambda_n^s),$$

$$(n^*, s^*) = \arg\max_{n \in N(m), s \in S(n)} (W_n^s / \lambda_n^s),$$

$$(n^*, s^*) = \mathrm{argmax}_{n \in N(m), s \in S(n)} \left( \alpha_n \frac{W_n^s c_{m,n}^s}{\lambda_n^s} - (1-\alpha_n) E_n^s \right),$$
with $\alpha_n \in [0, 1]$, $$(n^*, s^*) = \mathrm{argmax}_{n \in N(m), s \in S(n)} \left( \alpha_n \frac{c_{m,n}^s}{\lambda_n^s} - (1-\alpha_n) E_n^s \right),$$
with $\alpha_n \in [0, 1]$, $$(n^*, s^*) = \mathrm{argmax}_{n \in N(m), s \in S(n)} \left( \alpha_n \frac{W_n^s}{\lambda_n^s} - (1-\alpha_n) E_n^s \right),$$
with $\alpha_n \in [0, 1]$, where $W_n^s$ is a size of a frequency spectrum segment s available at a network node n, $\lambda_n^s$ is a corresponding utilization indicated by the network node n, $c_{m,n}^s$ is an estimate of a spectral efficiency provided by the network node n in the frequency spectrum segment s for the user device m, $E_n^s$ is an indication of an energy cost for using the frequency spectrum segment s at the network node n, $\mathcal{N}(m)$ is a set of network nodes that received the broadcasted access signal $S_A$ from the user device m, $\mathcal{S}(n)$ is a set of frequency spectrum segments s available at the network node n, and $n \in \mathcal{N}(m)$.

2. The user device m according to claim 1, wherein the access signal $S_A$ further comprises at least one reference signal.

3. The user device m according to claim 1, wherein the access signal $S_A$ further comprises one or more of the following user device information: service type; subscription type; traffic type; amount of traffic needed; average or minimum or maximum data traffic needed; average or minimum or maximum bandwidth needed; supported radio access technologies; supported frequency bands; preferred frequency bands; supported frequency spectrum segments; and preferred frequency spectrum segments.

4. The user device m according to claim 1, wherein the access response signal $S_R$ further indicates the identity of the at least one network node; and wherein the transceiver further is configured to derive the identity of the at least one network node based on the access response signal $S_R$.

5. The user device m according to claim 1, wherein the transceiver is further configured to broadcast the access signal $S_A$ in a dedicated broadcast channel.

6. The user device m according to claim 1, wherein the transceiver is further configured to broadcast the access signal $S_A$ in one or more separate frequency spectrum segments.

7. A network node for a wireless communication system, the network node comprising:
   a transceiver configured to receive a broadcasted access signal $S_A$ from a user device m, wherein the broadcasted access signal $S_A$ comprises identity information of the user device m; and
   a processor configured to:
      estimate a first communication performance indicator for a first available frequency spectrum segment at the network node based on the broadcasted access signal $S_A$;

obtain from at least a second network node of the wireless communication system a second communication performance indicator, wherein the second communication performance indicator is associated with the user device m and a second available frequency spectrum segment at the second network node; and assign at least one of the first frequency spectrum segment and the second frequency spectrum segment for communication for the user device m based on the first communication performance indicator and the second communication performance indicator;

wherein the transceiver is further configured to transmit an access response signal $S_R$ to the user device m, wherein the access response signal $S_R$ comprises an indication of the at least one assigned frequency spectrum segment s* for communication in the wireless communication system, and wherein the processor is further configured to assign the at least one assigned frequency spectrum segment s* or at least one assigned network node n*, based on any of the first and second communication performance indicators, by satisfying one of the following criteria:

$$(n^*, s^*) = \arg\max_{n \in N(m), s \in S(n)} (W_n^s c_{m,n}^s / \lambda_n^s),$$

$$(n^*, s^*) = \arg\max_{n \in N(m), s \in S(n)} (c_{m,n}^s / \lambda_n^s),$$

$$(n^*, s^*) = \arg\max_{n \in N(m), s \in S(n)} (W_n^s / \lambda_n^s),$$

$$(n^*, s^*) = \arg\max_{n \in N(m), s \in S(n)} \left(\alpha_n \frac{W_n^s c_{m,n}^s}{\lambda_n^s} - (1-\alpha_n) E_n^s\right), \text{ with } \alpha_n \in [0, 1],$$

$$(n^*, s^*) = \arg\max_{n \in N(m), s \in S(n)} \left(\alpha_n \frac{c_{m,n}^s}{\lambda_n^s} - (1-\alpha_n) E_n^s\right), \text{ with } \alpha_n \in [0, 1],$$

$$(n^*, s^*) = \arg\max_{n \in N(m), s \in S(n)} \left(\alpha_n \frac{W_n^s}{\lambda_n^s} - (1-\alpha_n) E_n^s\right), \text{ with } \alpha_n \in [0, 1],$$

where $W_n^s$ is a size of a frequency spectrum segment s available at a network node n, $\lambda_n^s$ is a corresponding utilization indicated by the network node n, $c_{m,n}^s$ is an estimate of a spectral efficiency provided by the network node n in the frequency spectrum segment s for the user device m, $E_n^s$ is an indication of an energy cost for using the frequency spectrum segment s at the network node n, $\mathcal{N}(m)$ is a set of network nodes that received the broadcasted access signal $S_A$ from the user device m, $\mathcal{S}(n)$ is a set of frequency spectrum segments s available at the network node n, and n∈$\mathcal{N}(m)$.

8. The network node according to claim 7, wherein the access response signal $S_R$ further comprises, for the at least one assigned frequency spectrum segment s*, one or more of the following network information: traffic types supported; amount of traffic supported; services supported; and network identity for the at least one assigned network node n*.

9. The network node according to claim 7, wherein at least one of the first and second communication performance indicators comprise one or more of the following: achievable data rate; achievable maximum or minimum or average data rate; achievable spectral efficiency; achievable maximum or minimum or average spectral efficiency; achievable latency; achievable maximum or minimum or average latency; and maximum or minimum or average number of frequency resources.

10. The network node according to claim 7, wherein:
the broadcasted access signal $S_A$ further comprises one or more of the following user device information: service type, subscription type, traffic type, amount of traffic needed, average or minimum or maximum data traffic needed, average or minimum or maximum bandwidth needed, supported radio access technologies, supported frequency bands, preferred frequency bands, supported frequency spectrum segments, and preferred frequency spectrum segments; and
the processor is further configured to assign the at least one frequency spectrum segment s* based on the one or more user device information.

11. The network node according to claim 7, wherein:
the transceiver is further configured to receive at least one network report message from one or more third network nodes, wherein the at least one network report message comprises one or more of the following information elements associated with the user device m: communication performance indicator, type of traffic, amount of traffic, average or minimum or maximum data traffic needed, average or minimum or maximum bandwidth needed, supported radio access technologies, supported frequency bands, preferred frequency bands, supported frequency spectrum segments, and preferred frequency spectrum segments; and
the processor is further configured to assign at least one second frequency spectrum segment to the user device m based on the one or more information elements associated with the user device m.

12. The network node according to claim 7, wherein:
the transceiver is further configured to receive at least one network report message from one or more third network nodes, wherein the at least one network report message comprises one or more of the following information elements associated with at least one available frequency spectrum segment at the one or more third network nodes: communication performance indicator, average received power, traffic load, utilization level, bandwidth, and transmission power; and
the processor is further configured to assign at least one second frequency spectrum segment to the user device m based on the one or more information elements associated with the at least one available frequency spectrum segment at the one or more third network nodes.

13. A method in a user device m for a wireless communication system, the method comprising:
broadcasting an access signal $S_A$ when not being connected to any radio communication networks, the access signal $S_A$ configured to be received by at least a first network node and a second network node, wherein the access signal $S_A$ comprises identity information of the user device m;
receiving an access response signal $S_R$ from a radio communication network in response to broadcasting the access signal $S_A$, wherein the access response signal $S_R$ comprises an indication of at least one assigned frequency spectrum segment s* for communication in the wireless communication system, wherein the at least one assigned frequency spectrum segment s* is assigned by the radio communication network based on (i) a first communication performance indicator estimated at the first network node based on the broadcasted access signal $S_A$, and (ii) a second communication performance indicator estimated at the second network node based on the broadcasted access signal $S_A$; and communicating with at least one network node of the radio communication network using the at least one assigned frequency spectrum segment s*;

wherein the at least one assigned frequency spectrum segment s* or at least one assigned network node n* is assigned based on any of the first and second communication performance indicators, and in satisfaction of one of the following criteria:

$$(n^*, s^*) = \arg\max_{n \in N(m), s \in S(n)} (W_n^s c_{m,n}^s / \lambda_n^s),$$

$$(n^*, s^*) = \arg\max_{n \in N(m), s \in S(n)} (c_{m,n}^s / \lambda_n^s),$$

$$(n^*, s^*) = \arg\max_{n \in N(m), s \in S(n)} (W_n^s / \lambda_n^s),$$

$$(n^*, s^*) = \arg\max_{n \in N(m), s \in S(n)} \left( \alpha_n \frac{W_n^s c_{m,n}^s}{\lambda_n^s} - (1-\alpha_n) E_n^s \right), \text{ with } \alpha_n \in [0,1],$$

$$(n^*, s^*) = \arg\max_{n \in N(m), s \in S(n)} \left( \alpha_n \frac{c_{m,n}^s}{\lambda_n^s} - (1-\alpha_n) E_n^s \right), \text{ with } \alpha_n \in [0,1],$$

$$(n^*, s^*) = \arg\max_{n \in N(m), s \in S(n)} \left( \alpha_n \frac{W_n^s}{\lambda_n^s} - (1-\alpha_n) E_n^s \right), \text{ with } \alpha_n \in [0,1],$$

where $W_n^s$ is a size of a frequency spectrum segment s available at a network node n, $\lambda_n^s$ is a corresponding utilization indicated by the network node n, $c_{m,n}^s$ is an estimate of a spectral efficiency provided by the network node n in the frequency spectrum segment s for the user device m, $E_n^s$ is an indication of an energy cost for using the frequency spectrum segments at the network node n, $\mathcal{N}(m)$ is a set of network nodes that received the broadcasted access signal $S_A$ from the user device m, $\mathcal{S}(n)$ is a set of frequency spectrum segments s available at the network node n, and $n \in \mathcal{N}(m)$.

14. A method in a network node for a wireless communication system, the method comprising:

receiving a broadcasted access signal $S_A$ from a user device m, wherein the broadcast access signal $S_A$ comprises identity information of the user device m;

estimating a first communication performance indicator for a first available frequency spectrum segment at the network node based on the broadcasted access signal $S_A$;

obtaining from at least a second network node of the wireless communication system a second communication performance indicator, wherein the second communication performance indicator is associated with the user device m and a second available frequency spectrum segment at the second network node;

assigning at least one of the first frequency spectrum segment and the second frequency spectrum segment for communication for the user device m based on the first communication performance indicator and the second communication performance indicator; and transmitting an access response signal $S_R$ to the user device m in response to receiving the broadcasted access signal $S_A$, wherein the access response signal $S_R$ comprises an indication of the at least one assigned frequency spectrum segment s* for communication in the wireless communication system;

wherein the at least one assigned frequency spectrum segment s* or at least one assigned network node n* is assigned based on any of the first and second communication performance indicators, by satisfying one of the following criteria:

$$(n^*, s^*) = \arg\max_{n \in N(m), s \in S(n)} (W_n^s c_{m,n}^s / \lambda_n^s),$$

$$(n^*, s^*) = \arg\max_{n \in N(m), s \in S(n)} (c_{m,n}^s / \lambda_n^s),$$

$$(n^*, s^*) = \arg\max_{n \in N(m), s \in S(n)} (W_n^s / \lambda_n^s),$$

$$(n^*, s^*) = \arg\max_{n \in N(m), s \in S(n)} \left( \alpha_n \frac{W_n^s c_{m,n}^s}{\lambda_n^s} - (1-\alpha_n) E_n^s \right), \text{ with } \alpha_n \in [0,1],$$

$$(n^*, s^*) = \arg\max_{n \in N(m), s \in S(n)} \left( \alpha_n \frac{c_{m,n}^s}{\lambda_n^s} - (1-\alpha_n) E_n^s \right), \text{ with } \alpha_n \in [0,1],$$

$$(n^*, s^*) = \arg\max_{n \in N(m), s \in S(n)} \left( \alpha_n \frac{W_n^s}{\lambda_n^s} - (1-\alpha_n) E_n^s \right), \text{ with } \alpha_n \in [0,1],$$

where $W_n^s$ is a size of a frequency spectrum segment s available at a network node n, $\lambda_n^s$ is a corresponding utilization indicated by the network node n, $c_{m,n}^s$ is an estimate of a spectral efficiency provided by the network node n in the frequency spectrum segment s for the user device m, $E_n^s$ is an indication of an energy cost for using the frequency spectrum segment s at the network node n, $\mathcal{N}(m)$ is a set of network nodes that received the broadcasted access signal $S_A$ from the user device m, $\mathcal{S}(n)$ is a set of frequency spectrum segments s available at the network node n, and $n \in \mathcal{N}(m)$.

\* \* \* \* \*

UNITED STATES PATENT AND TRADEMARK OFFICE
CERTIFICATE OF CORRECTION

Page 1 of 1

PATENT NO. : 10,440,635 B2
APPLICATION NO. : 15/402939
DATED : October 8, 2019
INVENTOR(S) : Soldati et al.

It is certified that error appears in the above-identified patent and that said Letters Patent is hereby corrected as shown below:

In the Claims

Claim 1: Column 26, Line 31: "s available at the network node n," should read -- available at the network node n, --.

Claim 7: Column 27, Line 51: "s available at the network node n," should read -- available at the network node n, --.

Claim 13: Column 29, Line 38: "s available at the network node n," should read -- available at the network node n, --.

Claim 14: Column 30, Line 47: "s available at the network node n," should read -- available at the network node n, --.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*